US012058020B1

(12) United States Patent
Creusen et al.

(10) Patent No.: US 12,058,020 B1
(45) Date of Patent: Aug. 6, 2024

(54) SYNCHRONIZING AUDIO PLAYBACK FOR CO-LOCATED DEVICES

(71) Applicant: Google LLC, Mountain View, CA (US)

(72) Inventors: Ivo Marco Creusen, Singapore (SG); Esbjörn Dominique, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/297,208

(22) Filed: Apr. 7, 2023

(51) Int. Cl.
*H04L 43/087* (2022.01)
*H04M 3/56* (2006.01)
*H04L 12/18* (2006.01)

(52) U.S. Cl.
CPC .......... *H04L 43/087* (2013.01); *H04M 3/568* (2013.01); *H04L 12/1831* (2013.01)

(58) Field of Classification Search
CPC ... H04L 43/087; H04L 12/1831; H04M 3/568
See application file for complete search history.

(56) References Cited

U.S. PATENT DOCUMENTS 11,418,655 B2  8/2022  Loiko et al.

OTHER PUBLICATIONS

GitHub.com, "Identifiers for WebRTC's Statistics API.", Aug. 4, 2023, https://w3c.github.io /webrtc-stats/# dom-rtcinboundrtpstreamstats-jitterbufferdelay, retrieved Sep. 26, 2023, 57 pages.
GitHub.com, "WebRTC Extensions.", Sep. 21, 2023, https://w3c.github.io/webrtc-extensions/#dom-rtcrtpreceiver-playoutdelay, retrieved Sep. 26, 2023, 25 pages.

*Primary Examiner* — Jungwon Chang
(74) *Attorney, Agent, or Firm* — DORITY & MANNING P.A.

(57) ABSTRACT

Delay reporting information descriptive of an existing delay of the participant computing device is received from each participant computing device of a participant cohort. The existing delay includes a period of time between transmission of audio data from the teleconference computing system and receipt of the audio data by the participant computing device. The participant cohort includes multiple participant computing devices that are co-located within a same area and are connected to a teleconference hosted by the teleconference computing system. A target delay is determined for the participant cohort. The target delay includes a period of time greater than the existing delay of participant computing devices. The target delay is configured to cause synchronized audio playback when implemented by the devices. Target delay information indicative of the target delay is provided to the participant cohort.

20 Claims, 7 Drawing Sheets

SYNCHRONIZING AUDIO PLAYBACK FOR CO-LOCATED DEVICES

FIELD

The present disclosure relates generally to audio synchronization. More specifically, the present disclosure relates to synchronizing audio playback for computing devices located within the same area (e.g., the same room, etc.).

BACKGROUND

Teleconferencing refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

SUMMARY

Aspects and advantages of embodiments of the present disclosure will be set forth in part in the following description, or can be learned from the description, or can be learned through practice of the embodiments.

One example aspect of the present disclosure is directed to a teleconference computing system. The teleconference computing system includes one or more processors and one or more non-transitory computer-readable media that store instructions that, when executed by the one or more processors, cause the teleconference computing system to perform operations. The operations include receiving, from each participant computing device of a participant cohort, delay reporting information descriptive of an existing delay of the participant computing device, wherein the existing delay includes a period of time between transmission of audio data from the teleconference computing system and receipt of the audio data by the participant computing device, and wherein the participant cohort includes a plurality of participant computing devices that are co-located within a same area and are connected to a teleconference hosted by the teleconference computing system. The operations include determining a target delay for the participant cohort, wherein the target delay includes a period of time greater than the existing delay of two or more of the plurality of participant computing devices, and wherein the target delay is configured to cause synchronized audio playback when implemented by the plurality of participant computing devices. The operations include providing target delay information indicative of the target delay to the plurality of participant computing devices of the participant cohort.

Another example aspect of the present disclosure is directed to a computer-implemented method. The method includes determining, by a participant computing device comprising one or more computing devices, an existing delay comprising (a) a period of time between transmission of audio data from a teleconference computing system and receipt of the audio data by the participant computing device (b) a period of time in which audio data is stored in a jitter buffer of the participant computing device. The participant computing device is assigned to a participant cohort that includes a plurality of participant computing devices that are co-located within a same area and are connected to a teleconference hosted by the teleconference computing system. The method includes providing, by the participant computing device, delay reporting information descriptive of the existing delay to the teleconference computing system. The method includes, responsive to providing the delay reporting information, receiving, by the participant computing device from the teleconference computing system, target delay information indicative of a target delay greater than the existing delay, wherein the target delay is configured to cause synchronized audio playback when implemented by the plurality of participant computing devices. The method includes causing, by the participant computing device, playback of audio data at an audio output device associated with the participant computing device, wherein causing playback of the audio data includes sending, by the participant computing device, the audio data to the jitter buffer and adding, by the participant computing device, an artificial delay to the jitter buffer corresponding to a difference between the target delay and the existing delay.

Another example aspect of the present disclosure is directed to a One or more non-transitory computer-readable media that store instructions that, when executed by one or more processors of a participant computing device of a plurality of participant computing devices connected to a teleconference, cause the participant computing device to perform operations. The operations include exchanging, with a second participant computing device of the plurality of participant computing devices, delay reporting information descriptive of an existing delay and a target delay of the participant computing device. The existing delay includes a period of time between transmission of audio data and receipt of the audio data by the participant computing device. The target delay includes a period of time greater than the existing delay, wherein the target delay is configured to cause synchronized audio playback when implemented by the participant computing device and the second participant computing device, and wherein the participant computing device and the second participant computing device are co-located within a same area. The operations include, based on the delay reporting information, determining a difference in delay between the target delay of the participant computing device and the target delay of the second participant computing device. The operations include causing playback of audio data at an audio output device associated with the participant computing device. Causing playback of the audio data includes sending the audio data to a jitter buffer of the participant computing device and adjusting an artificial delay in the jitter buffer based on the difference in delay.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
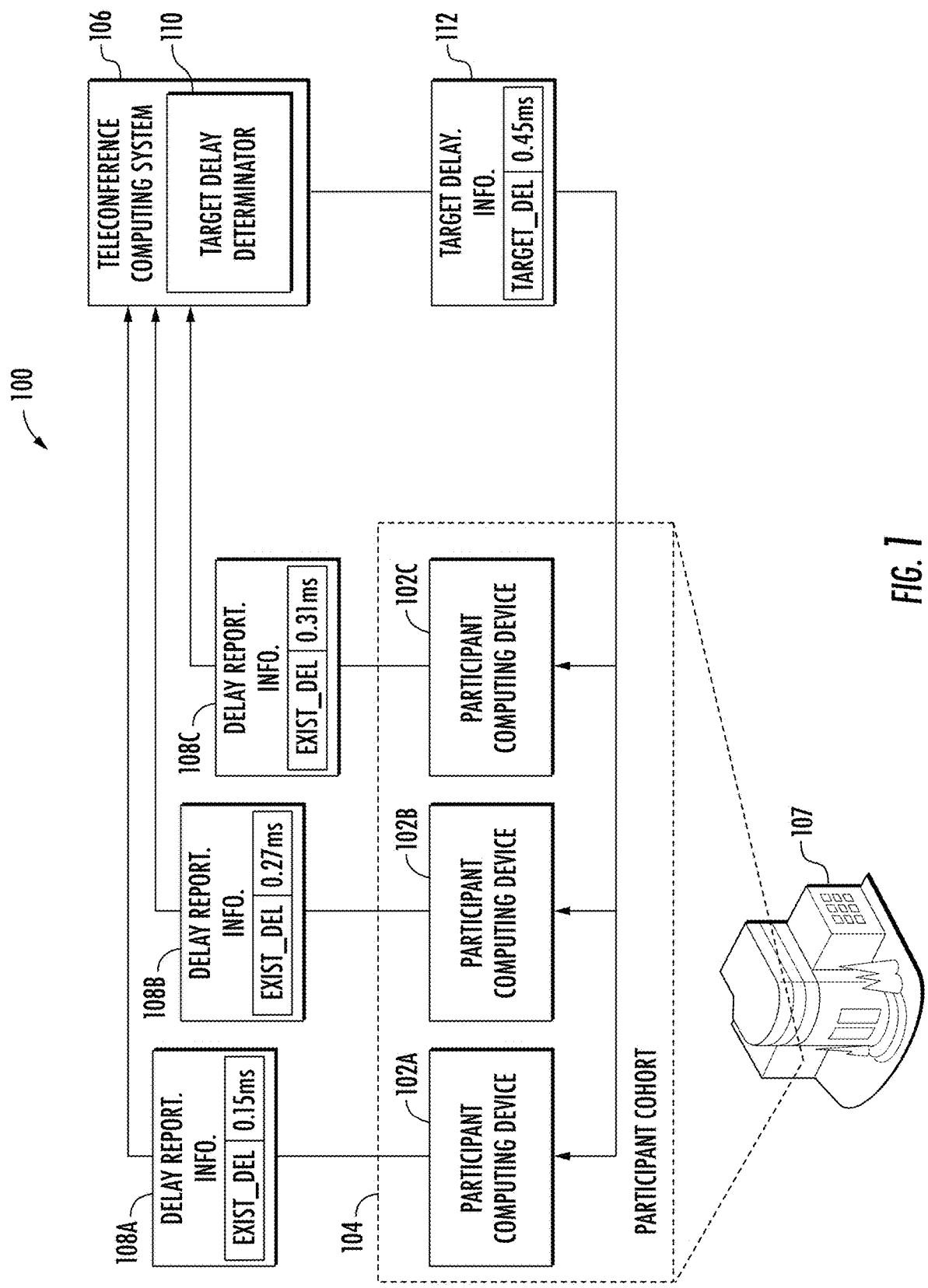
FIG. 1 depicts an overview data flow diagram for orchestration of synchronized audio playback for co-located participant computing devices according to some implementations of the present disclosure.

Reference numerals that are repeated across plural figures are intended to identify the same features in various implementations.

DETAILED DESCRIPTION

Generally, the present disclosure is directed to synchronizing audio playback between co-located participant computing devices. More specifically, with the rising popularity of teleconferencing, it is increasingly common for co-located participants (e.g., participants located within the same room, etc.) to individually participate in the same teleconferencing session (e.g., three co-workers who each have a desk in the same room may individually participate in the same teleconference from their desks). Teleconferencing refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

However, if multiple co-located participants are utilizing audible audio output devices, such as speakers, even slight differences in the delay between receiving audio data and playing the audio data will cause echo, render the audio output unintelligible, and substantially degrade the experience of all co-located participants.

Accordingly, implementations of the present disclosure propose the synchronization of audio playback for multiple co-located participant computing devices. For example, assume that a number of participant computing devices (e.g., smartphones, laptops, desktop computers, etc.) are being used to participate in a teleconference while physically located within the same room. A teleconference computing system (e.g., a computing system that orchestrates the teleconference) can receive delay reporting information from co-located participant devices that indicates an existing delay at each of the devices (e.g., a delay caused by network latency, jitter buffer processing, etc.). Based on the information, the teleconference computing system can determine a target delay that is greater than any existing delay of the devices. The teleconference computing system can provide information to the co-located devices that indicates the target delay so that the co-located devices can implement the target delay (e.g., by adding artificial delay to the jitter buffer, etc.). In such fashion, by determining a target delay for each co-located participant device, the teleconference computing system can facilitate synchronized audio playback, therefore eliminating a substantial source of echo while enhancing the teleconferencing experience for participants.

Aspects of the present disclosure provide a number of technical effects and benefits. As one example technical effect and benefit, example aspects of the present disclosure, asynchronous playback of audio by co-located devices can make it prohibitively difficult for participants to participate in a teleconference, causing participants to relocate or to utilize a single device for participation. However, by synchronizing playback of audio for co-located devices, implementations of the present disclosure can enhance the teleconferencing experience for participants while facilitating the usage of individual devices for multiple co-located participants.

With reference now to the Figures, example implementations of the present disclosure will be discussed in further detail.

FIG. 1 depicts an overview data flow diagram 100 for orchestration of synchronized audio playback for co-located participant computing devices according to some implementations of the present disclosure. Specifically, as depicted, participant computing devices 102A, 102B, and 102C (e.g., smartphones, laptops, desktop computers, wearable computing devices, etc.) can be co-located devices (e.g., located within the same room, the same semi-enclosed space, etc.) assigned to a participant cohort 104. Participant cohort 104 can be a grouping of participant computing devices based on a physical location of the devices.

For example, a teleconference computing system 106 can host a teleconference (e.g., an audioconference, a videoconference, etc.). Assume that participant computing devices 102A, 102B, and 102C (generally, participant computing devices 102) are located in the same room of a building 107. Each of the participant computing devices 102 can separately connect to the teleconference to participate in the teleconference. Based on the location of each participant computing device 102, the teleconference computing system 106 can group the participant computing devices 102 to form participant cohort 104. Once formed, the participant cohort 104 can serve as a single "entity" that collectively represents the participant computing devices 102 to the other participant computing devices connected to the teleconference that are not assigned to the participant cohort 104 (e.g., a single collective avatar within an interface of the teleconference, etc.).

It is relatively common for participants to participate in a teleconference using participant computing devices with audio output devices that are audible to other participants that are located within the same area (e.g., speakers, etc.). However, as described previously, the delay between a broadcast of audio data from the teleconference computing system 106, and playback of the audio data at an audio output device of the participant computing devices 102, is often different for each participant computing device 102. For example, if participant computing device 102A is a smartphone connected to a mobile network, and participant computing device 102B is a laptop connected to a WiFi network, one of the two devices can receive the broadcast 50 ms after the other device. Due to the differences in playback delay, once audio playback is initiated by the participant computing devices 102, the audio will necessarily be out-of-sync, making it prohibitively difficult for participants to understand the audio.

Accordingly, implementations of the present disclosure propose synchronizing audio playback by setting a target delay greater than any existing delay at the participant computing devices 102. To follow the depicted example, each participant computing device 102 can determine an existing delay between transmission of audio data from the teleconference computing system 106 and playback of the audio data by the participant computing device 102. For example, participant computing device 102A can determine that multiple sources of delay (e.g., network delay, jitter buffer delay, etc.) collectively form an existing delay of 15 ms. Participant computing devices 102 can generate delay reporting information 108A, 108B, and 108C (generally, delay reporting information 108) and transmit the information to the teleconference computing system 106. The delay reporting information 108 can indicate the existing delay determined by a respective participant computing device.

Based on the delay reporting information 108, the teleconference computing system 106 can use a target delay determinator 110 to determine a target delay for the participant cohort 104 (e.g., for the participant computing devices 102 assigned to the participant cohort 104, etc. The target delay can be a period of time that is greater than the existing delay indicated by any of the delay reporting information 108. For example, the delay reporting information 108 can respectively indicate existing delays of 15 ms, 27 ms, and 31 ms for the participant computing devices 102. Based on the existing delays, the teleconference computing system 106 can determine a target delay of 45 ms. By determining a target delay that is greater than the existing delays of the participant computing devices 102, the teleconference computing system 106 can reduce the chance that one of the participant computing devices 102 overshoots the target delay due to natural fluctuations in delay (e.g., network latency, etc.).

The teleconference computing system 106 can provide target delay information 112 to the participant computing devices 102 that indicates the target delay, and each of the participant computing devices 102 can implement the target delay (e.g., by adding artificial delay to the jitter buffer, etc.). To follow the depicted example, the participant computing device 102A has an existing delay of 15 ms. To meet the target delay of 45 ms, the participant computing device 102A can add 30 ms of artificial delay to its jitter buffer. Similarly, to meet the target delay of 45 ms, the participant computing device 102B can add 18 ms of artificial delay to the jitter buffer. By each locally implementing the target delay, the participant computing devices 102 can collectively cause synchronized playback of audio data transmitted by the teleconference computing system 106, therefore obviating the problems caused by out-of-sync audio and enhancing the teleconferencing experience for co-located participants of the participant cohort by providing a pseudo surround-sound audio effect.

It should be noted that the participant computing devices 102 and the teleconference computing system 106 can communicate via various network(s). Network(s) utilized by various devices and systems to communicate will be discussed in greater detail with regards to FIG. 7 (e.g., network(s) 799 of FIG. 7, etc.).

Figure 2:
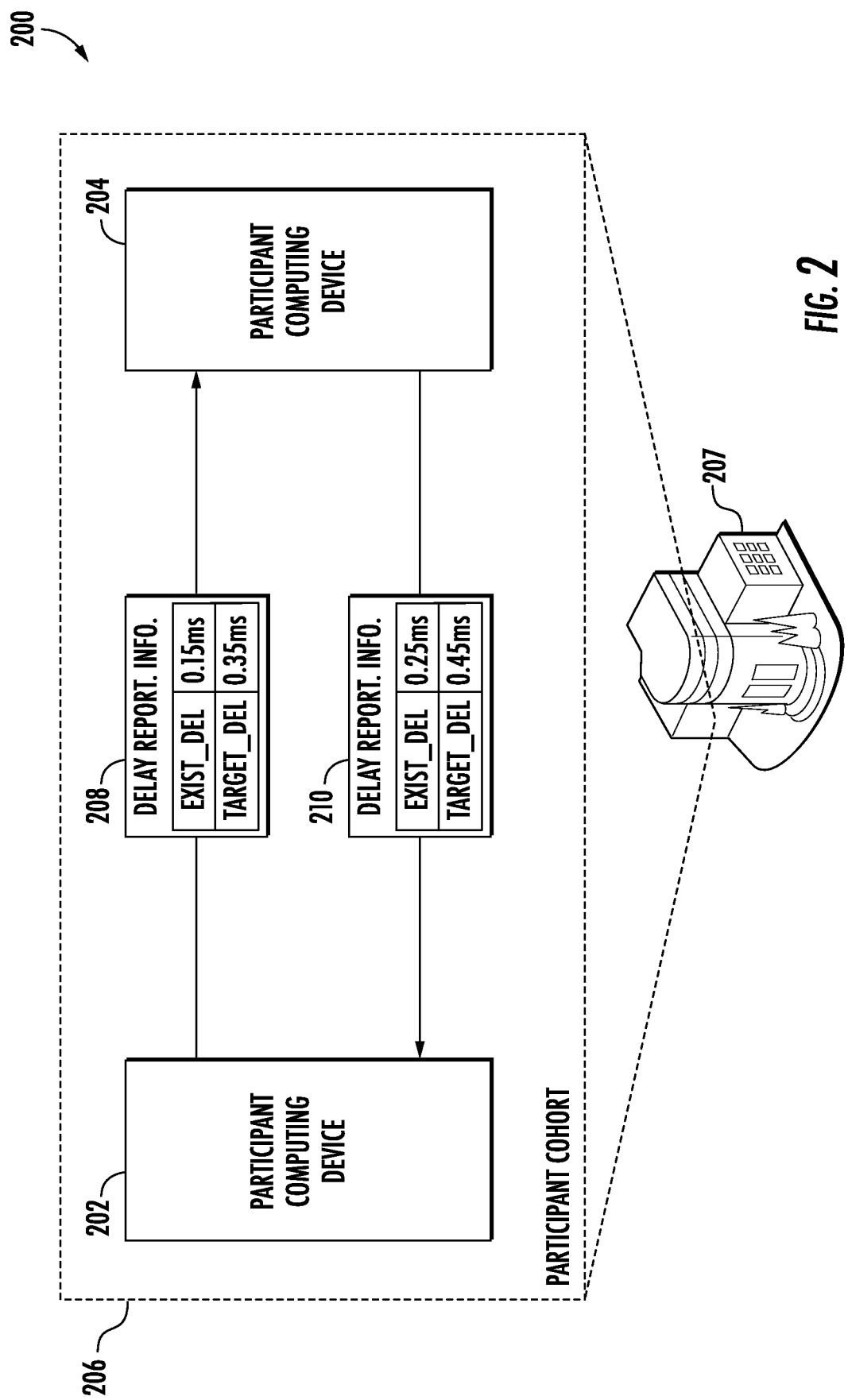
FIG. 2 depicts an overview data flow diagram for peer-to-peer (P2P) synchronization of audio playback for co-located participant computing devices according to some implementations of the present disclosure.

FIG. 2 depicts an overview data flow diagram 200 for peer-to-peer (P2P) synchronization of audio playback for co-located participant computing devices according to some implementations of the present disclosure. Specifically, in some circumstances, a teleconference can be a peer-to-peer session in which audio data is directly exchanged between participant computing devices, rather than being broadcast from a teleconference computing system such as the teleconference computing system 106 of FIG. 1.

Without a central orchestrating entity such as a teleconference computing system, participant computing devices can exchange delay reporting information with each other to determine, and update, a target delay based on existing delays at the devices. To follow the depicted example, participant computing devices 202 and 204 can be co-located devices assigned to a participant cohort 206 as described with regards to participant computing devices 102 and participant cohort 104 of FIG. 1. The participant computing devices 202 and 204 can both be participating in a P2P teleconference by exchanging audio data with other participant computing devices connected to the P2P teleconference.

Assume that participant computing devices 202 and 204 co-located in the same room of a building 207, and are associated with speakers that are audible as described with regards to participant computing devices 102 of FIG. 1. As participant computing devices 202 and 204 are co-located, the devices can synchronize audio playback in a P2P manner to eliminate the problems caused by out-of-sync audio playback. To follow the depicted example, participant computing device 202 can determine an existing delay between receipt of audio data (e.g., from participant computing device 204, from other participant computing devices, etc.) and playback of the audio data. The participant computing device 202 can also determine a target delay by adding a predetermined amount of delay to its existing delay. For example, if the participant computing device 202 has an existing delay of 15 ms, the participant computing device 202 can determine a target delay of 35 ms by adding a predetermined 20 ms of delay to its existing delay.

The participant computing device 202 can generate delay reporting information 208 that indicates the existing delay and the determined target delay. Participant computing device 204 can generate delay reporting information 210 in the same manner. The participant computing devices 202 and 204 can exchange the delay reporting information 208 and 210 in the same (or a similar) manner in which they exchange audio data. If the target delay indicated by delay reporting information received by a participant computing device is greater than the target delay currently implemented at the participant computing device, the participant computing device can increase its target delay to match the indicated target delay. Conversely, if the target delay indicated by delay reporting information received by a participant computing device is less than, or equal to, the target delay currently implemented at the participant computing device, the participant computing device can maintain its current target delay.

To follow the depicted example, the participant computing device 202 can have a current implemented target delay of 35 ms, as indicated by the delay reporting information 208 (e.g., a current delay of 35 ms added to its jitter buffer, etc.). Upon receipt of the delay reporting information 210, the participant computing device 202 can increase its target delay to 45 ms. Conversely, participant computing device 204 can maintain its current target delay of 45 ms upon receipt of the delay reporting information 208 that indicates a target delay of 35 ms. In such fashion, co-located participant computing devices can exchange delay reporting information in a peer-to-peer fashion to synchronize local playback of audio data within a teleconference to realize the same benefits as described with regards to FIG. 1.

Figure 3:
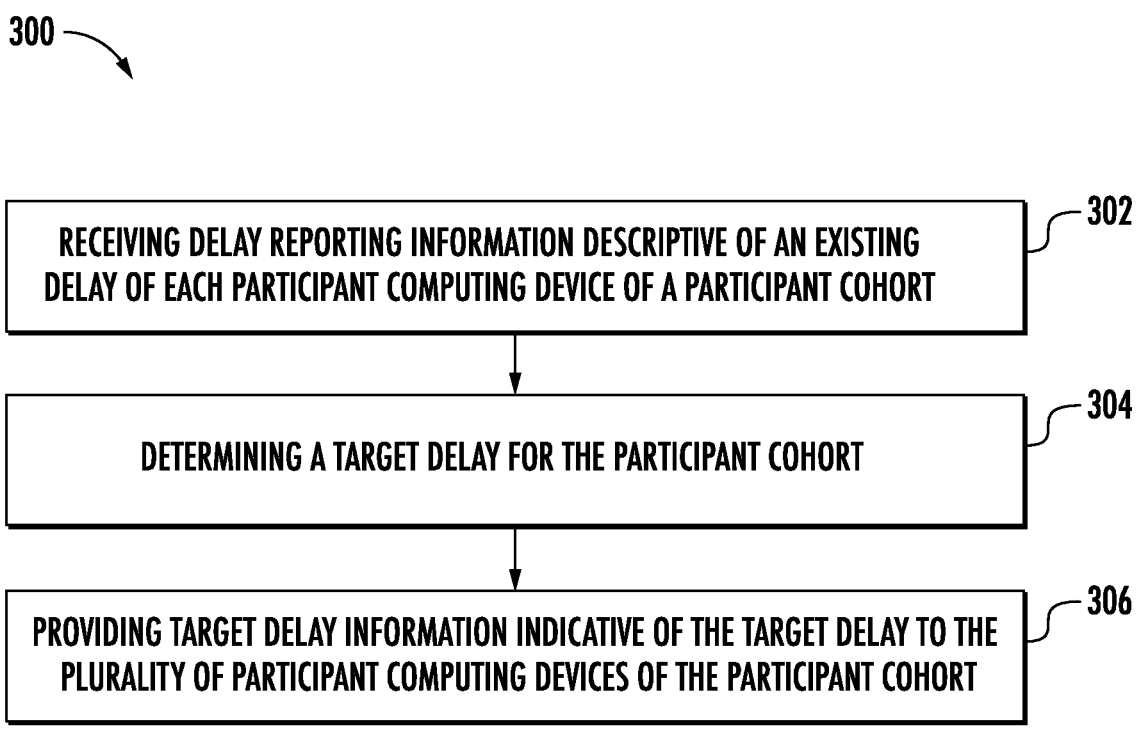
FIG. 3 is a flow diagram of an example method for synchronous audio playback for co-located computing devices, in accordance with some implementations of the present disclosure.

FIG. 3 is a flow diagram of an example method 300 for synchronous audio playback for co-located computing devices, in accordance with some implementations of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the audio playback module 714 of the participant computing device 702 of FIG. 7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, processing logic can receive delay reporting information from each participant computing device of a participant cohort. A participant computing device can be any type or manner of device that facilitates participation in a teleconference (e.g., a smartphone, laptop, Augmented Reality (AR)/Virtual Reality (VR) device, wearable device, etc.). A participant cohort, as described previously, can be a logical grouping of co-located participant computing devices based on the devices being located in the same area (e.g., the devices being located within the same room, within the same semi-enclosed space, etc.).

The delay reporting information can describe an existing delay of a participant computing device. The existing delay can include a period of time between transmission of audio data from the computing system and receipt of the audio data by the participant computing device. For example, the computing system can transmit audio data via the internet. If the participant computing device receives the audio data 50 ms later, the existing delay can include a network delay of 50 ms.

In some implementations, the existing delay can include a jitter buffer delay. For example, delay can be caused after audio data is received by a participant computing device due to processing, or "holding" of audio data (e.g., audio packets, etc.) in a jitter buffer (e.g., a buffer that ensures the continuity of audio streams by smoothing out packet arrival times). The existing delay can include the period of time in which audio data is stored in (or sent to, retrieved from, etc.) the jitter buffer.

More generally, it should be noted that the existing delay determined by the participant computing device can include any type or manner of delay in between transmission of audio data and playback of the audio data at the participant computing device. For example, assume that the audio output device associated with a participant computing device is a wireless speaker with a known processing delay associated with wireless transmission of audio data. The existing delay can include a period of time between transmission of the audio data from the participant computing device to the wireless speaker and playback of the audio data by the wireless speaker.

At operation 304, processing logic can determine a target delay for the participant cohort (e.g., for each device assigned to the participant cohort). The target delay can be, or otherwise include, a period of time greater than the existing delay of some (or all) of the participant computing devices assigned to the participant cohort.

For example, assume that five participant computing devices are assigned to the participant cohort. Four of the five devices can have existing delays between 50 ms and 100 ms, while the final device can have an existing delay of 500 ms. Due to the substantial difference between the existing delay of the final device and the existing delay of the other devices, the computing system can determine that the existing delay of 500 ms is greater than a target delay threshold. As such, rather than determine a target delay for all five devices assigned to the participant cohort, the computing system can instead determine a target delay for the four devices with existing delays of 100 or less (e.g., 125 ms, etc.) while instructing the final device to refrain from playback of subsequent audio data until its existing latency is below a latency threshold.

As described with regards to FIG. 1, the target delay can be configured to cause synchronized audio playback when implemented by the participant computing devices assigned to the participant cohort. More specifically, once each participant computing device assigned to a cohort implements an artificial delay that meets the target delay in conjunction with the existing delay (e.g., by adding the delay to the jitter buffer of the device), audio playback at the participant computing devices will be synchronized.

In some implementations, the computing system can determine the target delay based on various characteristics of the participant computing devices assigned to the participant cohort. Specifically, in some implementations, the computing system can receive information alongside the delay reporting information that describes characteristic(s) of the participant computing devices (e.g., a device type, etc.). Based on the information, the computing system can determine the existing delay.

For example, in some implementations the information describing the characteristic(s) of the participant computing devices can describe an audio output device associated with each participant computing device of the participant cohort. The computing system can determine that an audio output device associated with a participant computing device of the plurality of participant computing devices is insufficient for synchronized audio playback (e.g., the quality of the audio output device is too low, variations in delay caused by the audio output device are too high, etc.). Based on that determination, the computing system can provide instructions to the participant computing device in question to refrain from causing audio playback of subsequent audio data transmitted to the participant computing device.

At operation 306, processing logic can provide target delay information indicative of the target delay to the participant computing devices of the participant cohort. More specifically, the target delay information can describe the target delay to be implemented by the participant computing devices of the participant cohort. In some implementations, the target delay information can indicate a preferred, or mandatory, manner in which the target delay is to be implemented. For example, the target delay information can instruct the participant computing devices to implement the target delay by adding an artificial delay to the jitter buffer that, when combined with the existing delay at the participant computing device, is equal to the target delay. Alternatively, the target delay information can instruct the participant computing devices to implement the target delay in some other manner (e.g., sending the audio data to some other buffer for a period of time, etc.).

In some implementations, the computing system can receive additional delay reporting information from one of the participant computing devices assigned to the participant cohort. The additional delay reporting information can describe a change to the existing delay of the participant computing device. For example, assume that the participant computing device is a smartphone device communicating via a mobile network. The delay reporting information initially provided by the participant computing device can indicate an existing delay of 100 ms. However, the smartphone device can subsequently be switched to a different communication node within the mobile network that changes the existing delay to be 200 ms. The additional delay reporting information can indicate the change in existing delay from 100 ms to 200 ms.

In some implementations, based on the additional delay reporting information, the computing system can adjust the target delay for the participant cohort to obtain a modified target delay different than the target delay. To follow the previous example, if the smartphone device had the highest existing delay in the participant cohort at 100 ms, the initial target delay determined by the computing system can be 150 ms. The computing system can adjust the target delay of 150 ms for the participant cohort based on the change in existing delay (e.g., from 100 ms to 200 ms) to obtain a modified target delay of 250 ms.

For another example, assume that the smartphone device is switched to a different communication node within the mobile network that changes the existing delay from 100 ms to 50 ms. If 50 ms is still the highest existing delay within the participant cohort, the computing system can adjust the target delay of 150 ms for the participant cohort based on the change in existing delay (e.g., from 100 ms to 50 ms) to obtain a modified target delay of 100 ms. More specifically, if the computing system receives delay reporting information that describes a reduction in the existing delay of the participant computing device, and that device previously had the highest delay, the computing system can adjust the target delay to obtain a reduced target delay less than the target delay. In such fashion, the computing system can iteratively adjust a target delay based on changes in delay to maintain synchronous audio playback for co-located devices.

Figure 4:
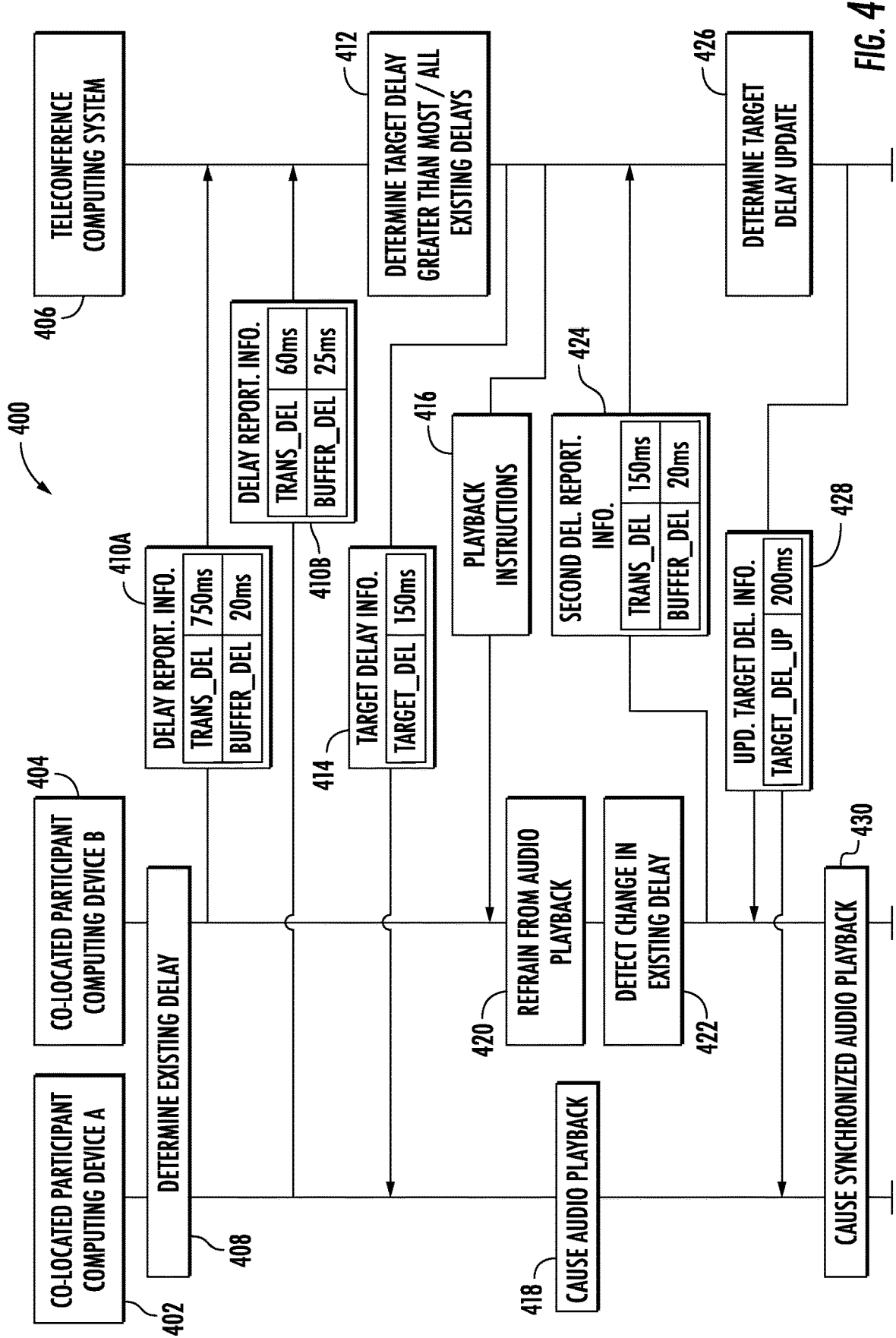
FIG. 4 is a communication flow diagram for host-mediated synchronization of audio playback between co-located participant computing devices participating in a teleconference according to some implementations of the present disclosure.

FIG. 4 is a communication flow diagram 400 for host-mediated synchronization of audio playback between co-located participant computing devices participating in a teleconference according to some implementations of the present disclosure. Specifically, co-located participant computing devices 402 and 404 can participate in a teleconference hosted by a teleconference computing system 406. At 408, the co-located participant computing devices 402 and 404 can determine an existing delay, and can transmit delay reporting information 410A and 410B to the teleconference computing system 406. For example, both participant computing devices 402 and 404 can determine an existing delay that includes a transmission delay (e.g., a period of time during which audio data is transmitted from a teleconference computing system and received by a participant computing device) and a buffer delay (e.g., a current amount of time associated with storage of audio data in a jitter buffer prior to playback of the audio data).

At 412, the teleconference computing system 406 can determine a target delay greater than most or all existing delays (e.g., the existing delays determined by the co-located participant computing devices 402 and 404). More specifically, the teleconference computing system 406 can provide target delay information 414 to participant computing devices that have an existing delay that is below a threshold delay, and can provide playback instructions 416 to any participant computing devices that have an existing delay at, or above, a threshold delay.

To follow the depicted example, assume that the threshold delay is 500 ms. The participant computing device 404 provides delay reporting information 410A that indicates a total delay of 85 ms (e.g., 60 ms transmission delay and 25 ms buffer delay). As the existing delay of the participant computing device 404 is less than the threshold delay of 500 ms, the teleconference computing system 406 can provide target delay information 414 that indicates a target delay of 150 ms. However, the co-located participant computing device 402 provides delay reporting information 410A that indicates a transmission delay of 750 ms. As 750 ms is greater than the threshold delay of 500 ms, the teleconference computing system 406 can provide playback instructions 416 to the participant computing device 404 that instruct the participant computing device 404 to refrain from audio playback (e.g., until existing delay is less than the threshold delay, until existing delay is less than the threshold delay for a period of time, etc.).

Generally, the threshold delay indicates a degree of delay that is "suboptimal" or otherwise insufficient for teleconferencing. If the teleconference computing system 406 determines a target delay that is greater than the existing delay of all the devices of the participant cohort, and one of the devices has an existing delay greater than the threshold delay, implementation of the target delay will cause synchronized playback with a delay that substantially reduces teleconference quality for participants. As such, rather than determining a target delay that is greater than any existing delay regardless of the quantity of delay, the teleconference computing system 406 can exclude outlier devices with much higher existing delay than other devices by providing those devices with playback instructions 416 to refrain from audio playback until their existing delay has fallen under the threshold delay.

Based on the target delay indicated by the target delay information 414, at 418 the participant computing device 402 can implement the target delay and cause audio playback. Conversely, based on the playback instructions 416, at 420 the participant computing device 404 can refrain from audio playback. At 422, the participant computing device 404 can detect a change in the existing delay at the device. For example, the participant computing device 404 may have been utilizing substantial bandwidth to download a file at 408, and may have finished the download prior to 422. Based on the detection of the change in existing delay, the participant computing device 404 can generate additional delay reporting information 424 and can provide the additional delay reporting information 424 to the teleconference computing system 406. The additional delay reporting information 424 can indicate the change in existing delay detected at 422 (e.g., can indicate the new existing delay, can indicate the delta between the new existing delay and the previous existing delay, etc.).

The teleconference computing system 406 can determine a target delay update at 426 based on the additional delay reporting information 424, and can transmit updated target delay information 428 to participant computing devices 402 and 404. To follow the depicted example, the additional delay reporting information can indicate that the transmission delay at the participant computing device 404 has changed from 750 ms to 150 ms for a total existing delay of 170 ms. As the existing delay at the participant computing device 404 is now less than the example threshold delay, the teleconference computing system 406 can determine to allow the participant computing device 404 to cause audio playback. As the participant computing device 404 now has the highest existing delay, the teleconference computing system 406 can determine an updated target delay that is higher than the existing delay of participant computing device 404 (e.g., 200 ms), and can transmit updated target delay information to the participant computing devices 402 and 404 that indicates the updated target delay. At 430, the participant computing devices 402 and 404 can both implement the updated target delay and cause synchronized audio playback.

Figure 5:
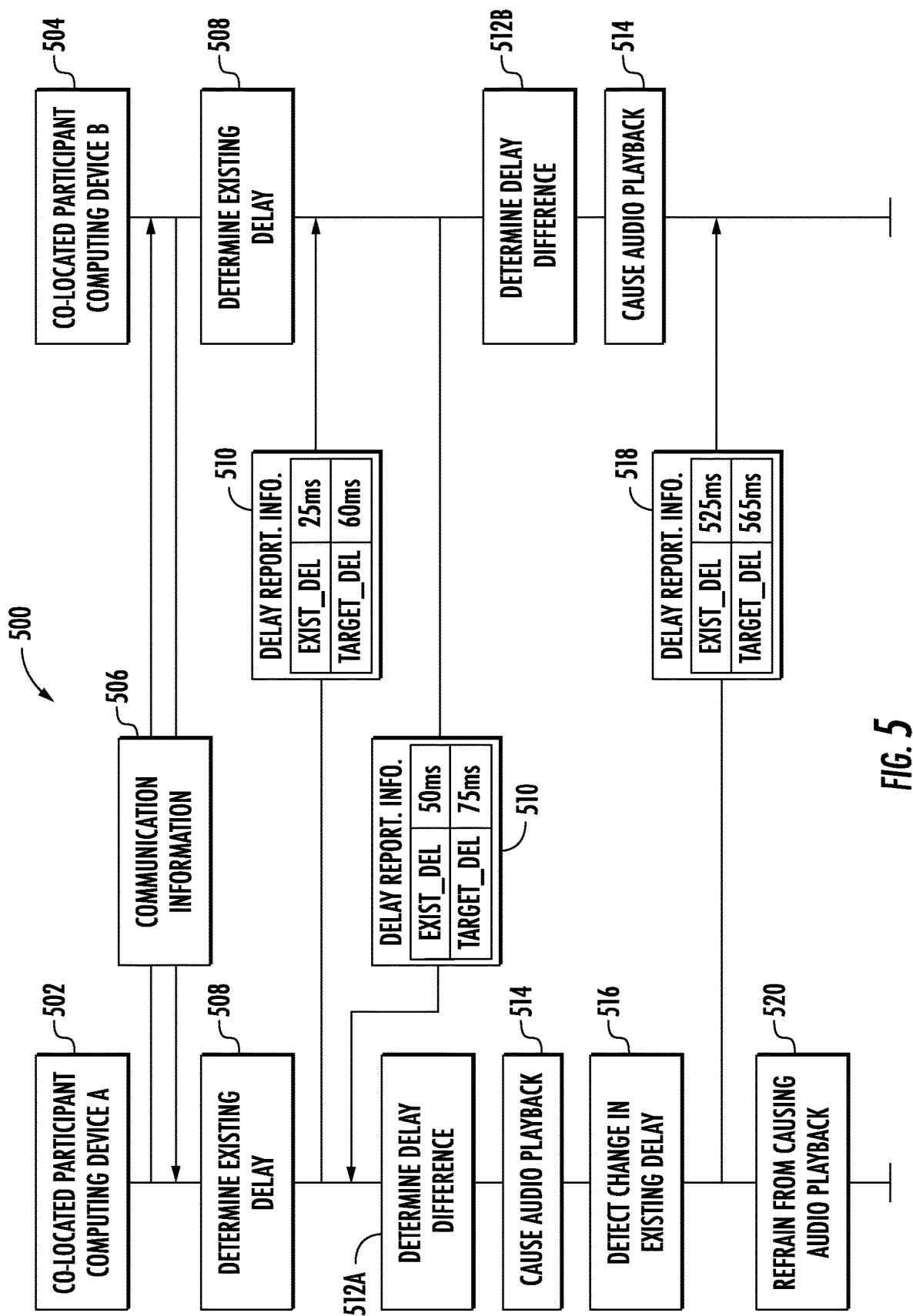
FIG. 5 is a communication flow diagram for P2P communication between co-located participant computing devices participating in a teleconference according to some implementations of the present disclosure.

FIG. 5 is a communication flow diagram 500 for P2P communication between co-located participant computing devices participating in a teleconference according to some implementations of the present disclosure. Specifically, co-located participant computing devices 502 and 504 can be devices that are connected to a P2P teleconferencing session in which both participant computing devices exchange communication data (e.g., audio data, video data, AR/VR data, textual content, etc.). Communication data generally refers to data that carries communications between participants. Communication data can be transmitted between participant computing devices (e.g., directly or indirectly via an intermediary) to facilitate communication between participants associated with the participant computing devices. Communication data can include audio data, video data, image data, audiovisual data, textual data, AR/VR data (e.g., pose data, etc.) or any other type or manner of data that can convey a communicative intent (e.g., emojis or other representations of particular emotions, feelings, and/or actions, animated images, etc.). At 506, the participant computing devices 502 and 504 can exchange communication information (e.g., audio data, video data, multimedia data, AR/VR data, etc.) that includes audio data. At 508, the participant computing devices 502 and 504 can determine an existing delay as described with regards to FIG. 2.

Based on the existing delays, the participant computing devices 502 and 504 can exchange delay reporting information 510. The delay reporting information 510 can indicate a current delay and a target delay. To follow the depicted example, the participant computing device 502 can determine an existing delay of 25 ms. The participant computing device 502 can add a constant quantity of delay to its existing delay to obtain a target delay (e.g., 35 ms added to 25 ms to obtain 60 ms). Similarly, the participant computing device 504 can determine an existing delay of 50 ms and can add a constant quantity of delay to its existing delay to obtain a target delay (e.g., 25 ms added to 50 ms to obtain 75 ms).

At 512 A participant computing device 502 can determine a difference between its target delay and the target delay indicated by delay reporting information 510 received from the participant computing device 504. To follow the depicted example, the participant computing device 502 can determine that its target delay of 75 ms is greater than the target delay of 60 ms indicated by the participant computing device 504. As its target delay is already greater than the target delay indicated by the participant computing device 504, the participant computing device 502 can maintain its current target delay. Conversely, as its target delay is lower than the target delay of participant computing device 502, the participant computing device 504 can increase its target delay from 60 ms to 75 ms. At 514, both participant computing devices 502 and 504 can cause audio playback while implementing a target delay of 75 ms.

At 516, the participant computing device 502 can detect a change in its existing delay (e.g., from 25 ms to 525 ms). For example, a change in nodes in a wireless network used by the participant computing device 502 can cause a temporary spike in latency from 25 ms to 525 ms.

In some implementations, the participant computing device 502 can provide additional delay reporting information 518 to the participant computing device 504. The delay reporting information 518 can indicate the spike in latency and the participant computing device 504 can determine to temporarily adjust its target delay to the target delay indicated by the delay reporting information 518 (e.g., 565). Alternatively, the participant computing device 504 can determine that the target delay indicated by the delay reporting information 518 exceeds a threshold delay, and can instead maintain its current target delay. In some implementations, the participant computing device 502 can determine that its target delay, and/or its existing delay, is greater than the threshold delay, and in response, refrain from causing audio playback at 529.

Figure 6:
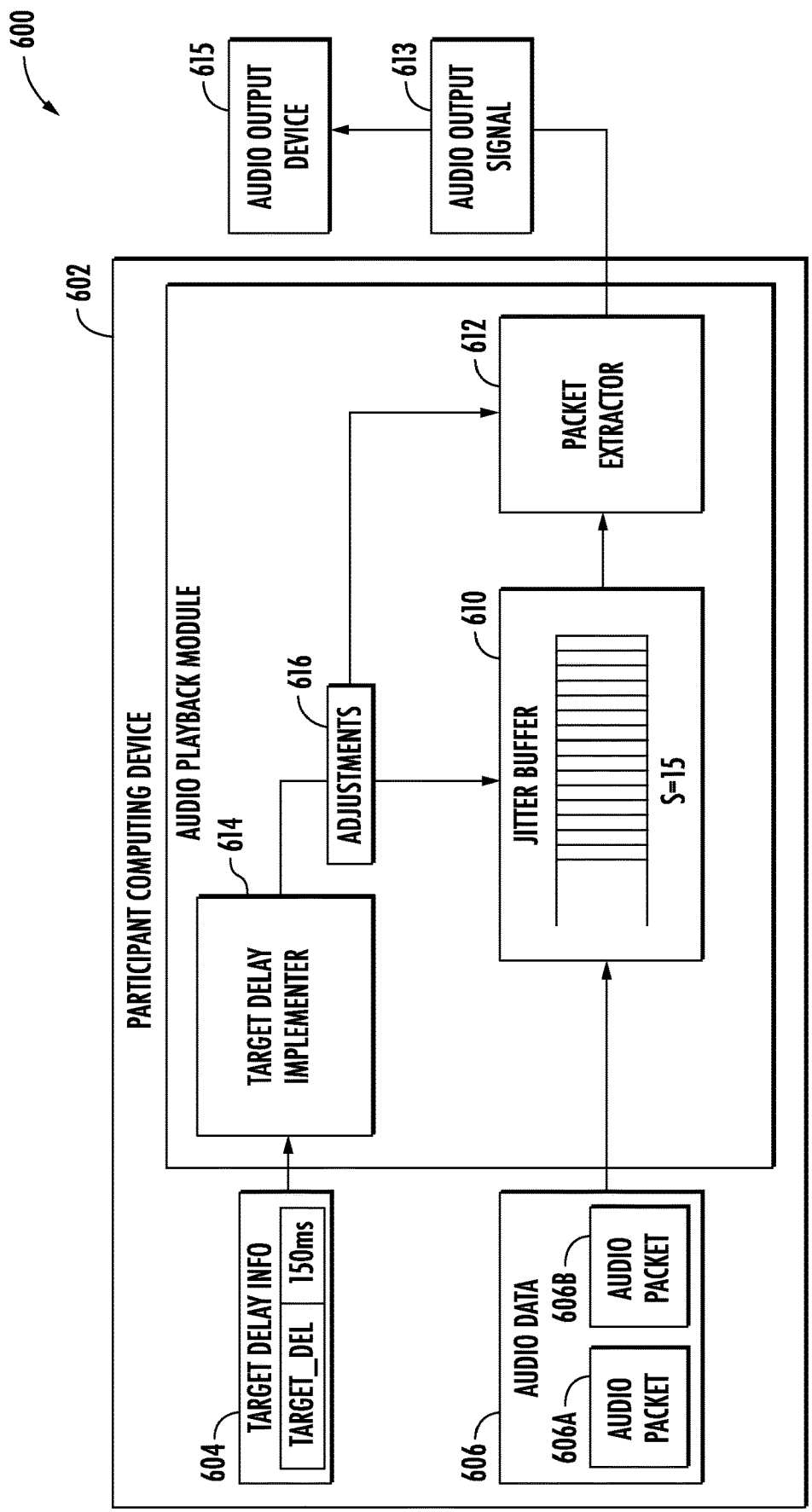
FIG. 6 is a block diagram of a participant computing device that implements a target delay in a jitter buffer for synchronization of audio according to some implementations of the present disclosure.

FIG. 6 is a block diagram 600 of a participant computing device 602 that implements a target delay in a jitter buffer for synchronization of audio according to some implementations of the present disclosure. More specifically, participant computing device 602 can obtain target delay information 604. The target delay information 604 can indicate a target delay for implementation by the participant computing device 602 as described with regards to FIGS. 1-5. The participant computing device 602 can also obtain audio data 606 that includes audio packets 606A and 606B.

The participant computing device 602 can include an audio playback module 608 that is operable to cause audio playback at an audio output device associated with the participant computing device 602. More specifically, the audio playback module 608 can include a jitter buffer 610. The jitter buffer 610 can be a buffer that stores audio packets, such as audio packets 606A and 606B, for uniform playback. For example, the jitter buffer 610 can store a certain number of audio packets (e.g., 15 audio packets). Packet extractor 612 can extract packets from the jitter buffer 610 at a uniform rate to generate an audio output signal 613 for an audio output device 615. In such fashion, the jitter buffer 610 can prevent choppy audio playback if fluctuations occur in the rate at which the participant computing device 602 receives audio packets.

The audio playback module 608 can include a target delay implementer 614 that implements the target delay indicated by the target delay information 604. In some implementations, the target delay implementer 614 can implement the target delay by increasing the size of the jitter buffer 610. To follow the depicted example, a jitter buffer size of 15 can correspond to a certain period of time (e.g., 20 ms of delay). To implement the target delay, the target delay implementer 614 can generate adjustments 616 that increase the size of the jitter buffer 610. Additionally, or alternatively, in some implementations, the target delay implementer 614 can implement the target delay by generating adjustments 616 that adjust the rate at which the packet extractor 612 extracts packets from the jitter buffer 610.

It should be noted that, to implement the target delay, the target delay implementer 614 is not limited to adjustments to the jitter buffer 610 or any other related components (e.g., packet extractor 612). Rather, the target delay implementer 614 can make any type or manner of adjustment to any particular aspect of the participant computing device 602 to implement the target delay.

Figure 7:
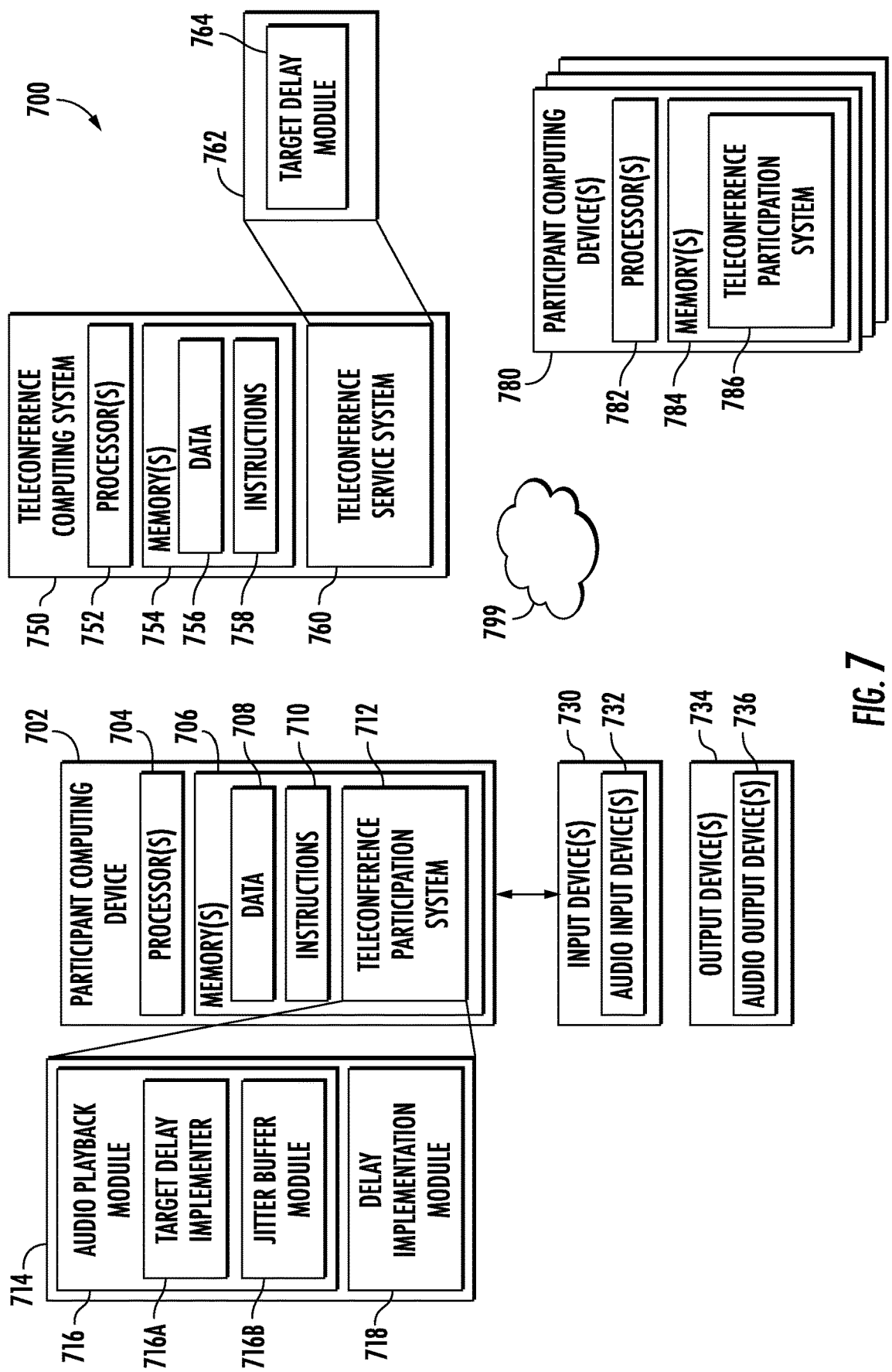
FIG. 7 depicts a block diagram of an example computing environment that performs synchronization of audio playback for co-located participant computing devices according to example implementations of the present disclosure.

FIG. 7 depicts a block diagram of an example computing environment 700 that performs synchronization of audio playback for co-located participant computing devices according to example implementations of the present disclosure. The computing environment 700 includes a participant computing device 702 that is associated with a participant in a teleconference, a teleconference computing system 750, and, in some implementations, other participant computing device(s) 780 respectively associated with other participants(s) in the teleconference.

The participant computing device 702 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

The participant computing device 702 includes processor(s) 704 and memory(s) 706. The processor(s) 704 can be any suitable processing device (e.g., a processor core, a microprocessor, an ASIC, an FPGA, a controller, a microcontroller, etc.) and can be one processor or processors that are operatively connected. The memory 706 can include non-transitory computer-readable storage media(s), such as RAM, ROM, EEPROM, EPROM, flash memory devices, magnetic disks, etc., and combinations thereof. The memory 706 can store data 708 and instructions 710 which are executed by the processor 704 to cause the participant computing device 702 to perform operations.

In particular, the memory 706 of the participant computing device 702 can include a teleconference participation system 712. The teleconference participation system 712 can facilitate participation in a teleconference by a participant associated with the participant computing device 702 (e.g., a teleconference hosted or otherwise orchestrated by teleconference computing system 750, etc.). To facilitate teleconference participation, the teleconference participation system 712 can include service module(s) 714 which, by providing various services, can collectively facilitate participation in a teleconference.

For example, the teleconference service module(s) 714 can include an audio playback module 716. The audio playback module 716 can cause audio playback of audio data received by the participant computing device 702. For example, the participant computing device 702 can receive a transmission of audio data from the teleconference computing system 750. The participant computing device 702 can utilize the audio playback module 716 to cause audio playback using an audio output device (e.g., output device(s) 734, etc.).

For another example, the audio playback module 716 can include a target delay implementer 716A and jitter buffer module 716B. The jitter buffer module 716B can implement a jitter buffer to reduce the risk of choppy audio playback as described with regards to FIG. 6 (e.g., using a jitter buffer in conjunction with a packet extractor, etc.). The target delay implementer 616A can implement a target delay in conjunction with the jitter buffer module 716B as described with regards to FIG. 6. For example, the target delay implementer 616A can increase the size of the jitter buffer of the jitter buffer module 616B.

For another example, the teleconference service module(s) 714 can include a delay determination module 618. The delay determination module 618 can be used to determine an existing delay, or a target delay, at the participant computing device 702. For example, the participant computing device 702 can receive a series of audio transmissions from the teleconference computing system 750. Each of the audio transmissions can indicate a time at which they were transmitted by the teleconference computing system 750. The delay determination module 618 can then determine a time at which playback of the audio transmissions occurs, and based on the difference between the times at which playback occurred and the times at which the audio transmissions were transmitted, can determine an existing delay at the participant computing device 702.

The participant computing device 702 can also include input device(s) 730 that receive inputs from a participant, or otherwise capture data associated with a participant. For example, the input device(s) 730 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 702 can include, or can be communicatively coupled to, input device(s) 730. For example, the input device(s) 730 can include a camera device that can capture two-dimensional video data of a participant associated with the participant computing device 702 (e.g., for broadcasting, etc.). In some implementations, the input device(s) 730 can include a number of camera devices communicatively coupled to the participant computing device 702 that are configured to capture image data from different perspectives for generation of three-dimensional pose data/representations (e.g., a representation of a user of the participant computing device 702, etc.).

In some implementations, the input device(s) 730 can include sensor devices configured to capture sensor data indicative of movements of a participant associated with the teleconference computing system 702 (e.g., accelerometer(s), Global Positioning Satellite (GPS) sensor(s), gyroscope(s), infrared sensor(s), head tracking sensor(s) such as magnetic capture system(s), an omnidirectional treadmill device, sensor(s) configured to track eye movements of the user, etc.).

In particular, the input device(s) 730 can include audio input device(s) 732 (e.g., microphones, microphone arrays, etc.). For example, the audio capture device(s) 732 can be, or otherwise include, a microphone array that captures high-quality audio data and provides the data as an audio input signal. For another example, the audio capture device(s) 732 can be a directional microphone that captures audio and a direction from which the audio was captured.

In some implementations, the participant computing device 702 can include, or be communicatively coupled to, output device(s) 734. Output device(s) 734 can be, or otherwise include, device(s) configured to output audio data, image data, video data, etc. For example, the output device(s) 734 can include a two-dimensional display device (e.g., a television, projector, smartphone display device, etc.). For another example, the output device(s) 734 can include display devices for an augmented reality device or virtual reality device.

In particular, the output device(s) 734 can include audio output device(s) 736. The audio output device(s) 736 can be any type or manner of audio device that can create, or otherwise simulate, stereo audio. For example, the audio output device(s) 736 can be a wearable audio output device (e.g., wired or wireless headphones, earbuds, bone conduction headphones, portable stereo simulation speakers, etc.). For another example, the audio output device(s) 736 can be multiple discrete audio output devices within a single audio output device (e.g., a soundbar device that simulates stereo audio). For yet another example, the audio output device(s) 736 can be separate audio output devices that produce stereo audio (e.g., multiple networked passive speakers, a wireless mesh speaker setup, etc.).

The teleconference computing system 750 includes processor(s) 752 and a memory 754. The processor(s) 752 can be any suitable processing device (e.g., a processor core, a microprocessor, an ASIC, an FPGA, a controller, a microcontroller, etc.) and can be one processor or processors that are operatively connected. The memory 754 can include non-transitory computer-readable storage media(s), such as RAM, ROM, EEPROM, EPROM, flash memory devices, magnetic disks, etc., and combinations thereof. The memory 754 can store data 756 and instructions 758 which are executed by the processor 752 to cause the teleconference computing system 750 to perform operations.

In some implementations, the teleconference computing system 750 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 750 can be, or otherwise include, physical processing devices, such as processing nodes within a cloud computing network (e.g., nodes of physical hardware resources).

The teleconference computing system 750 can facilitate the exchange of communication data within a teleconference using the teleconference service system 760. More specifically, the teleconference computing system 750 can utilize the teleconference service system 760 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 750 can utilize the teleconference service system 760 to handle any frontend or backend services directed to providing a teleconference. For example, the teleconference service system 760 can receive and broadcast (i.e., relay) data (e.g., video data, audio data, etc.) between the participant computing device 702 and participant computing device(s) 780. For another example, the teleconference service system 760 can facilitate direct communications between the participant computing device 702 and participant computing device(s) 780 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 760 can provide a videoconference service for multiple participants. One of the participants can transmit audio and video data to the teleconference service system 760 using a participant device (e.g., participant computing device 702, etc.). A different participant can transmit audio data to the teleconference service system 760 with a different participant computing device. The teleconference service system 760 can receive the data from the participants and broadcast the data to each computing system.

As another example, the teleconference service system 760 can implement an augmented reality (AR) or virtual reality (VR) conferencing service for multiple participants. One of the participants can transmit AR/VR data sufficient to generate a three-dimensional representation of the participant to the teleconference service system 760 via a device (e.g., video data, audio data, sensor data indicative of a pose and/or movement of a participant, etc.). The teleconference service system 760 can transmit the AR/VR data to devices of the other participants. In such fashion, the teleconference service system 760 can facilitate any type or manner of teleconferencing services to multiple participants.

It should be noted that the teleconference service system 760 can facilitate the flow of data between participants (e.g., participant computing device 702, participant computing device(s) 780, etc.) in any manner that is sufficient to implement the teleconference service. In some implementations, the teleconference service system 760 can be configured to receive data from participants, decode the data, encode the data, broadcast the data to other participants, etc. For example, the teleconference service system 760 can receive encoded video data from the participant computing device 702. The teleconference service system 760 can decode the video data according to a video codec utilized by the participant computing device 702. The teleconference service system 760 can encode the video data with a video codec and broadcast the data to participant computing devices.

In particular, to facilitate teleconference participation, the teleconference service system 760 can include hosting module(s) 762 which fulfill or orchestrate various teleconferencing services that collectively provide a teleconference for participants.

For example, the teleconference hosting module(s) 762 can include a target delay module 764. The target delay module 764 can determine a target delay based on delay reporting information received from the participant computing device 702 and/or participant computing device(s) 780. For example, the participant computing devices 702 and 780 can transmit delay reporting information to the teleconference computing system 750 that indicates an existing delay at the device. Based on the delay reporting information, the teleconference computing system 750 can utilize the target delay module 764 to determine a target delay greater than most (or all) of the existing delays indicated.

In some implementations, the teleconference computing system 750 includes, or is otherwise implemented by, server computing device(s). In instances in which the teleconference computing system 750 includes multiple server computing devices, such server computing devices can operate according to sequential computing architectures, parallel computing architectures, or some combination thereof.

In some implementations, the transmission and reception of data by teleconference computing system 750 can be accomplished via the network 799. For example, in some implementations, the participant computing device 702 can capture video data, audio data, multimedia data (e.g., video data and audio data, etc.), sensor data, etc. and transmit the data to the teleconference computing system 750. The teleconference computing system 750 can receive the data via the network 799.

In some implementations, the teleconference computing system 750 can receive data from the participant computing device(s) 702 and 780 according to various encryption scheme(s) (e.g., codec(s), lossy compression scheme(s), lossless compression scheme(s), etc.). For example, the participant computing device 702 can encode audio data with an audio codec, and then transmit the encoded audio data to the teleconference computing system 750. The teleconference computing system 750 can decode the encoded audio data with the audio codec. In some implementations, the participant computing device 702 can dynamically select between a number of different codecs with varying degrees of loss based on conditions (e.g., available network bandwidth, accessibility of hardware/software resources, etc.) of the network 799, the participant computing device 702, and/or the teleconference computing system 750. For example, the participant computing device 702 can dynamically switch from audio data transmission according to a lossy encoding scheme to audio data transmission according to a lossless encoding scheme based on a signal strength between the participant computing device 702 and the network 799.

The teleconference computing system 750 and the participant computing device 702 can communicate with the participant computing device(s) 780 via the network 799. The participant computing device(s) 780 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 780 includes processor(s) 782 and a memory 784 as described with regards to the participant computing device 702. Specifically, the participant computing device(s) 780 can be the same, or similar, device(s) as the participant computing device 702. For example, the participant computing device(s) 780 can each include a teleconference participation system 786 that includes at least some of the modules 714 of the teleconference participation system 712. For another example, the participant computing device(s) 780 can include, or can be communicatively coupled to, the same type of input and output devices as described with regards to input device(s) 730 and output device(s) 734 (e.g., device(s) 732, device(s) 736, etc.). Alternatively, in some implementations, the participant computing device(s) 780 can be different devices than the participant computing device 702, but can also facilitate teleconferencing with the teleconference computing system 750. For example, the participant computing device 702 can be a laptop and the participant computing device(s) 780 can be smartphone(s).

The network 799 can be any type of communications network, such as a local area network (e.g., intranet), wide area network (e.g., Internet), or some combination thereof and can include any number of wired or wireless links. In general, communication over the network 799 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

Transmission quality: As used herein, the term "transmission quality" generally refers to a perceivable quality of a transmission of communications data. In particular, transmission quality can refer to, or otherwise account for a technical quality of the transmission, such as degree of loss associated with the transmission, a resolution, a bitrate, etc. Additionally, or alternatively, the term transmission can refer to a semantic quality of the transmission, such as a degree of background noise, a clarity associated with spoken utterances of participants, etc. As such, it should be broadly understood that the "transmission quality" of a transmission can be determined in accordance with a variety of factors.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
   determining, by a participant computing device comprising one or more processing devices, an existing delay comprising:
   (a) a period of time between transmission of audio data from a teleconference computing system and receipt of the audio data by the participant computing device; and
   (b) a period of time in which audio data is stored in a jitter buffer of the participant computing device,
   wherein the participant computing device is assigned to a participant cohort that comprises a plurality of participant computing devices that are co-located within a same area and are connected to a teleconference hosted by the teleconference computing system;
   providing, by the participant computing device, delay reporting information descriptive of the existing delay to the teleconference computing system;
   responsive to providing the delay reporting information, receiving, by the participant computing device from the teleconference computing system, target delay information indicative of a target delay greater than the existing delay, wherein the target delay is configured to cause synchronized audio playback when implemented by the plurality of participant computing devices; and causing, by the participant computing device, playback of audio data at an audio output device associated with the participant computing device, wherein causing playback of the audio data comprises:

sending, by the participant computing device, the audio data to the jitter buffer; and adding, by the participant computing device, an artificial delay to the jitter buffer corresponding to a difference between the target delay and the existing delay.

2. The computer-implemented method of claim 1, wherein the method further comprises determining, by the participant computing device, a change in the existing delay.

3. The computer-implemented method of claim 2, wherein the method further comprises adjusting, by the participant computing device, the artificial delay to the jitter buffer based on the change in the existing delay.

4. The computer-implemented method of claim 2, wherein the method further comprises:

providing, by the participant computing device, second delay reporting information descriptive of the change to the existing delay to the teleconference computing system; and responsive to providing the second delay reporting information, receiving, by the participant computing device from the teleconference computing system, updated target delay information indicative of a modified target delay different than the target delay; and adjusting, by the participant computing device, the artificial delay to the jitter buffer based on the updated target delay information.

5. A teleconference computing system, comprising:

one or more processors;

one or more non-transitory computer-readable media that store instructions that, when executed by the one or more processors, cause the teleconference computing system to perform operations, the operations, comprising:

receiving, from each participant computing device of a participant cohort, delay reporting information descriptive of an existing delay of the participant computing device, wherein the existing delay comprises a period of time between transmission of audio data from the teleconference computing system and receipt of the audio data by the participant computing device, and wherein the participant cohort comprises a plurality of participant computing devices that are co-located within a same area and are connected to a teleconference hosted by the teleconference computing system;

determining a target delay for the participant cohort, wherein the target delay comprises a period of time greater than the existing delay of two or more of the plurality of participant computing devices, and wherein the target delay is configured to cause synchronized audio playback when implemented by the plurality of participant computing devices; and providing target delay information indicative of the target delay to the plurality of participant computing devices of the participant cohort.

6. The teleconference computing system of claim 5, wherein receiving the delay reporting information comprises receiving delay reporting information descriptive of an existing delay comprising:

(a) the period of time between the transmission of the audio data from the teleconference computing system and the receipt of the audio data from the teleconference computing system; and (b) a period of time in which audio data is stored in a jitter buffer of the participant computing device.

7. The teleconference computing system of claim 6, wherein determining the target delay for the participant cohort comprises determining a target delay configured to be implemented using the jitter buffer of the participant computing device.

8. The teleconference computing system of claim 5, wherein determining the target delay comprises determining that an existing delay of a participant computing device of the plurality of participant computing devices is greater than a target delay threshold; and wherein providing the target delay information indicative of the target delay to the plurality of participant computing devices of the participant cohort comprises providing, to the participant computing device of the plurality of participant computing devices, instructions to refrain from causing audio playback of subsequent audio data transmitted to the participant computing device.

9. The teleconference computing system of claim 5, wherein, receiving the delay reporting information from each participant computing device of the participant cohort further comprises receiving, from each participant computing device of the participant cohort, information descriptive of one or more characteristics of the participant computing device.

10. The teleconference computing system of claim 9, wherein receiving the information descriptive of the one or more characteristics of the participant computing device comprises receiving, from each participant computing device of the participant cohort, information descriptive of an audio output device associated with each participant computing device of the participant cohort;

wherein determining the target delay comprises determining that an audio output device associated with a participant computing device of the plurality of participant computing devices is insufficient for synchronized audio playback; and wherein providing the target delay information indicative of the target delay to the plurality of participant computing devices of the participant cohort comprises providing, to the participant computing device of the plurality of participant computing devices, instructions to refrain from causing audio playback of subsequent audio data transmitted to the participant computing device.

11. The teleconference computing system of claim 9, wherein receiving, from each participant computing device of the participant cohort, the information descriptive of the one or more characteristics of the participant computing device further comprises:

determining, based on the information descriptive of the one or more characteristics, that at least two of the plurality of participant computing devices comprise a same device type; and identifying a delay associated with all devices of the device type; and wherein determining the target delay comprises determining the target delay for the participant cohort based at least in part on the device type.

12. The teleconference computing system of claim 5, wherein the operations further comprise receiving, from a participant device of the plurality of participant computing devices, second delay reporting information descriptive of a change to the existing delay of the participant computing device;
based on the second delay reporting information, adjusting the target delay for the participant cohort to obtain a modified target delay different than the target delay; and
providing updated target delay information indicative of the modified target delay to the plurality of participant computing devices of the participant cohort.

13. The teleconference computing system of claim 12, wherein receiving the second delay reporting information comprises receiving, from the participant device of the plurality of participant computing devices, second delay reporting information descriptive of a reduction in the existing delay of the participant computing device; and
wherein adjusting the target delay for the participant cohort to obtain the modified target delay comprises adjusting, based on the second delay reporting information, the target delay for the participant cohort to obtain a reduced target delay less than the target delay.

14. One or more non-transitory computer-readable media that store instructions that, when executed by one or more processors of a participant computing device of a plurality of participant computing devices connected to a teleconference, cause the participant computing device to perform operations, the operations comprising:
exchanging, with a second participant computing device of the plurality of participant computing devices, delay reporting information descriptive of an existing delay and a target delay of the participant computing device, wherein:
the existing delay comprises a period of time between transmission of audio data and receipt of the audio data by the participant computing device; and
the target delay comprises a period of time greater than the existing delay, wherein the target delay is configured to cause synchronized audio playback when implemented by the participant computing device and the second participant computing device, and wherein the participant computing device and the second participant computing device are co-located within a same area;
based on the delay reporting information, determining a difference in delay between the target delay of the participant computing device and the target delay of the second participant computing device; and
causing playback of audio data at an audio output device associated with the participant computing device, wherein causing playback of the audio data comprises:
sending the audio data to a jitter buffer of the participant computing device; and
adjusting an artificial delay in the jitter buffer based on the difference in delay.

15. The one or more non-transitory computer-readable media of claim 14, wherein exchanging the delay reporting information comprises exchanging, with the second participant computing device of the plurality of participant computing devices, delay reporting information descriptive of an existing delay and the target delay of the participant computing device, wherein the existing delay comprises (a) the period of time between transmission of audio data and receipt of the audio data by the participant computing device, and (b) a period of time in which audio data is stored in a jitter buffer of the participant computing device.

16. The one or more non-transitory computer-readable media of claim 14, wherein determining the difference in delay comprises determining, based on the delay reporting information, that the target delay of the second participant computing device is greater than the target delay of the participant computing device;
wherein adjusting the artificial delay in the jitter buffer comprises increasing the artificial delay in the jitter buffer based on the difference in delay.

17. The one or more non-transitory computer-readable media of claim 14, wherein determining the difference in delay comprises:
determining, based on the delay reporting information, that the existing delay is less than the target delay of both the participant computing device and the second participant computing device; and
making a determination that differences between the existing delay and the target delay at both the participant computing device and the second participant computing device are greater than a threshold degree of difference; and
wherein adjusting the artificial delay in the jitter buffer comprises, responsive to making the determination, reducing the artificial delay in the jitter buffer.

18. The one or more non-transitory computer-readable media of claim 14, wherein determining the difference in delay comprises:
determining, based on the delay reporting information, that the target delay of the participant computing device is greater than the target delay of the second participant computing device; and
making a determination that a difference between the target delay of the participant computing device and the target delay of the second participant computing device is greater than a threshold degree of difference; and
wherein causing playback of audio data at an audio output device associated with the participant computing device further comprises refraining from causing subsequent playback of audio data at the audio output device associated with the participant computing device.

19. The one or more non-transitory computer-readable media of claim 14, wherein the operations further comprise determining a change in the existing delay.

20. The one or more non-transitory computer-readable media of claim 19, wherein the operations further comprise:
providing second delay reporting information descriptive of the change to the existing delay to the second participant computing device; and
adjusting the artificial delay to the jitter buffer based on the change in the existing delay.

* * * * *